United States Patent
Sato et al.

(10) Patent No.: US 7,860,409 B2
(45) Date of Patent: Dec. 28, 2010

(54) OPTICAL RECEIVER, OPTICAL RECEIVING APPARATUS USING THE OPTICAL RECEIVER AND OPTICAL RECEIVING METHOD THEREOF

(75) Inventors: Masaki Sato, Tokyo (JP); Morihiko Ota, Tokyo (JP); Tadashi Koga, Tokyo (JP)

(73) Assignee: NEC Corporation, Tokyo (JP)

( * ) Notice: Subject to any disclaimer, the term of this patent is extended or adjusted under 35 U.S.C. 154(b) by 595 days.

(21) Appl. No.: 11/842,186

(22) Filed: Aug. 21, 2007

(65) Prior Publication Data
US 2008/0212982 A1 Sep. 4, 2008

(30) Foreign Application Priority Data
Aug. 23, 2006 (JP) .............................. 2006-225965

(51) Int. Cl.
*H04B 10/06* (2006.01)
(52) U.S. Cl. ........................................ 398/212; 398/213
(58) Field of Classification Search ................. 398/213, 398/212
See application file for complete search history.

(56) References Cited

U.S. PATENT DOCUMENTS

| 6,873,456 | B2 * | 3/2005 | Motoshima et al. ..... 359/337.11 |
| 2003/0081283 | A1 * | 5/2003 | Ishizuka et al. ............. 359/124 |
| 2005/0111077 | A1 * | 5/2005 | Hsiao et al. ................. 359/337 |
| 2009/0086310 | A1 * | 4/2009 | Sugaya et al. ............ 359/337.1 |

FOREIGN PATENT DOCUMENTS

JP 2003-23399 1/2003

OTHER PUBLICATIONS

Hikari Jyouhou Nettowaku, "Optical Information Network", edited by Kazuro Kikuchi, Ohmsha, Oct. 2002, p. 169. (on p. 2 of Specification.).

* cited by examiner

*Primary Examiner*—Leslie Pascal
(74) *Attorney, Agent, or Firm*—Young & Thompson

(57) ABSTRACT

An optical receiver includes an optical amplifier configured to amplify an input optical signal and output an amplified optical signal; and a light receiving element configured to convert the amplified optical signal into an electrical signal and output the electrical signal, and the optical amplifier controls an output-level of the amplified optical signal according to a wavelength of the input optical signal.

9 Claims, 6 Drawing Sheets

OPTICAL RECEIVER, OPTICAL RECEIVING APPARATUS USING THE OPTICAL RECEIVER AND OPTICAL RECEIVING METHOD THEREOF

BACKGROUND OF THE INVENTION

1. Field of the Invention

The present invention relates to an optical receiver, an optical receiving apparatus using the optical receiver and an optical receiving method thereof, more particularly relates to techniques to control the power level of an optical signal received at the optical receiver, the optical receiving apparatus and the optical receiving method used for wavelength division multiplexing (WDM) optical transmission systems.

2. Description of the Related Art

An optical receiving apparatus used for conventional wavelength division multiplexing (WDM) optical transmission systems is disclosed in reference document 1 (Japanese Patent Application Laid-open Publication No. 2003-023399, FIG. 29). FIG. 6 shows the WDM optical transmission system. A wavelength division multiplexed (WDM) optical signal is demultiplexed by a demultiplexer (DEMUX) 125 and the demultiplexed optical signals are input to each optical receiver. Each optical receiver has an optical amplifier 127 and an automatic level control unit (ALC) 128. The ALC 128 controls the output-level of the optical amplifier 127 by providing feedback thereto. Therefore, each optical signal has been received by each receiver 126 at a constant power level. Consequently, even if wavelength fluctuations happen to an optical signal input to certain receiver 126, input-level to the receiver 126 is maintained constant because the output-level from the optical amplifier 127 is maintained constant.

However, a light receiving element in the receiver 126 generally has a property that quantum efficiency is different for each wavelength, so-called "wavelength dependence of quantum efficiency". The wavelength dependence of quantum efficiency that a typical light receiving element has is shown in FIG. 7 (refer to "Hikari Jyouhou Nettowaku (Optical Information Network)" edited by Kazuro Kikuchi, Ohmsha, October, 2002, p. 169). The horizontal axis indicates wavelengths and the vertical axis indicates quantum efficiency. Quantum efficiency of InGaAs/InP, which is mainly used in WDM optical transmission systems at present, tends to deteriorate sharply at around 1.6 μm. Therefore, when a wavelength of light input to the light receiving element varies, electrical output-level from the light receiving element varies. As a result, in the reference document 1, when the wavelength varies, the electrical output-level from the light receiving element varies even if an optical input-level to the light receiving element is maintained constant. Until now, the fluctuations that happen in electrical output-level have been absorbed by an electrical circuit arranged at a stage after the light receiving element.

As for optical fiber communications in recent years, a speedup is required with enlarging capacity of information transmission, and therefore research and development of a 40 Gbps system has been carried out. The high speed optical transmission system of 40 Gbps or more places a severe constraint on the dynamic range of an electrical circuit arranged at a stage after the light receiving element. For example, in a clock-regeneration and discrimination circuit as an electrical circuit, the minimum distinguishable amplitude of the 40 Gbps system is about one order of magnitude larger than that of a 10 Gbps system. For that reason, the allowable amount of output amplitude fluctuations in the 40 Gbps system is about ten times smaller than that in the 10 Gbps system. Consequently, the 40 Gbps system becomes about ten times weaker than the 10 Gbps system in amplitude fluctuations of an electrical signal generated by wavelength fluctuations of an optical signal. As a result, the 40 Gbps system requires accuracy as high as about ten times the 10 Gbps system in amplitude adjustments which are performed according to the wavelength fluctuations.

As mentioned above, with the increase of transmission speed in recent years, fluctuations in the electrical output-level due to the wavelength dependence of quantum efficiency cannot be disregarded, and thereby the fluctuations have become a factor that makes transmission characteristics worse.

SUMMARY OF THE INVENTION

In view of the foregoing drawbacks of the related art methods and structures, the present invention seeks to provide an optical receiver, an optical receiving apparatus and an optical receiving method that are capable of maintaining an electrical output-level from a light receiving element constant even when a wavelength of an optical signal to be input to the light receiving element varies.

An optical receiver according to the present invention includes an optical amplifier configured to amplify an input optical signal and output an amplified optical signal; and a light receiving element configured to convert the amplified optical signal into an electrical signal and output the electrical signal, and the optical amplifier controls an output-level of the amplified optical signal according to a wavelength of the input optical signal.

An optical receiver according to the present invention includes an optical amplifier configured to amplify an input optical signal and output an amplified optical signal; and a light receiving element configured to convert the amplified optical signal into an electrical signal and output the electrical signal, and an output-level of the amplified optical signal is controlled according to an output-level of the electrical signal.

An optical receiving apparatus according to the present invention includes an optical demultiplexer configured to demultiplex a wavelength division multiplexed optical signal into a plurality of optical signals having mutually different wavelengths and output the plurality of optical signals; and a plurality of the optical receivers as described above, each configured to receive a respective one of the plurality of optical signals.

An optical receiving method according to the present invention includes amplifying an input optical signal; outputting an amplified optical signal; converting the amplified optical signal into an electrical signal; and outputting the electrical signal, and an output-level of the amplified optical signal is controlled according to a wavelength of the input optical signal.

An optical receiving method according to the present invention includes amplifying an input optical signal; outputting an amplified optical signal; converting the amplified optical signal into an electrical signal; and outputting the electrical signal, and an output-level of the amplified optical signal is controlled according to an output-level of the electrical signal.

Accordingly, with the configuration and method as described above, the optical receiver, the optical receiving apparatus and the optical receiving method control the optical output-level from the optical amplifier, which is arranged at a stage before the light receiving element, according to the wavelength of the optical signal to be input to the light receiving element. As a result, the present invention produces an effect that makes it possible to maintain the electrical output-level from the light receiving element constant even when the wavelength of the optical signal to be input to the light receiving element varies.

BRIEF DESCRIPTION OF THE DRAWINGS

Various aspects, features and advantages of the present invention will become more apparent from the following detailed description of preferred embodiments when taken in conjunction with the accompanying drawings wherein.

DETAILED DESCRIPTION OF PREFERRED EMBODIMENTS

Figure 1:
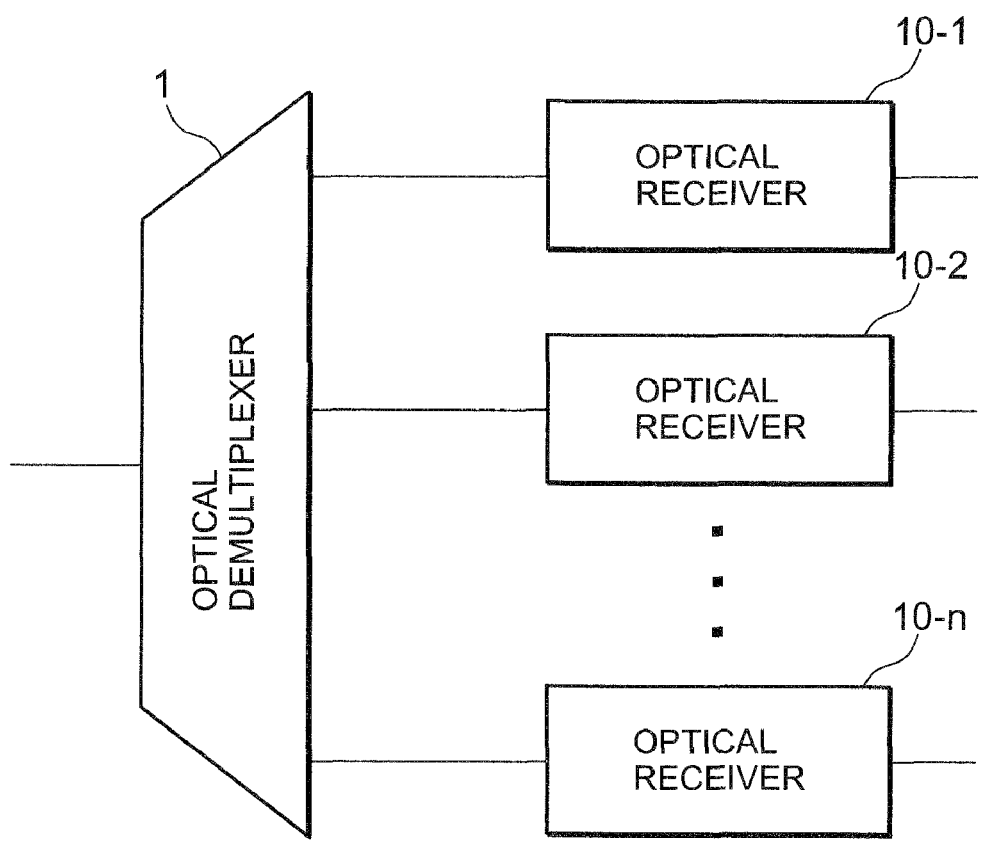
FIG. 1 is a block diagram showing an optical receiving apparatus in a wavelength division multiplexing optical transmission system according to an embodiment of the present invention.

An optical receiving apparatus according to a first embodiment of the present invention, as shown in FIG. 1, includes an optical demultiplexer 1 and n optical receivers 10-1 to 10-n (n is an integer of 2 or more) each arranged at respective output-terminals of the optical demultiplexer 1. The optical receiving apparatus receives a wavelength division multiplexed (WDM) optical signal in which n optical signals having mutually different wavelengths, which are sent from an optical transmitting apparatus (not shown), are multiplexed. The optical demultiplexer 1 demultiplexes the WDM optical signal into n optical signals having mutually different wavelengths and then outputs the demultiplexed n optical signals.

Figure 2A:
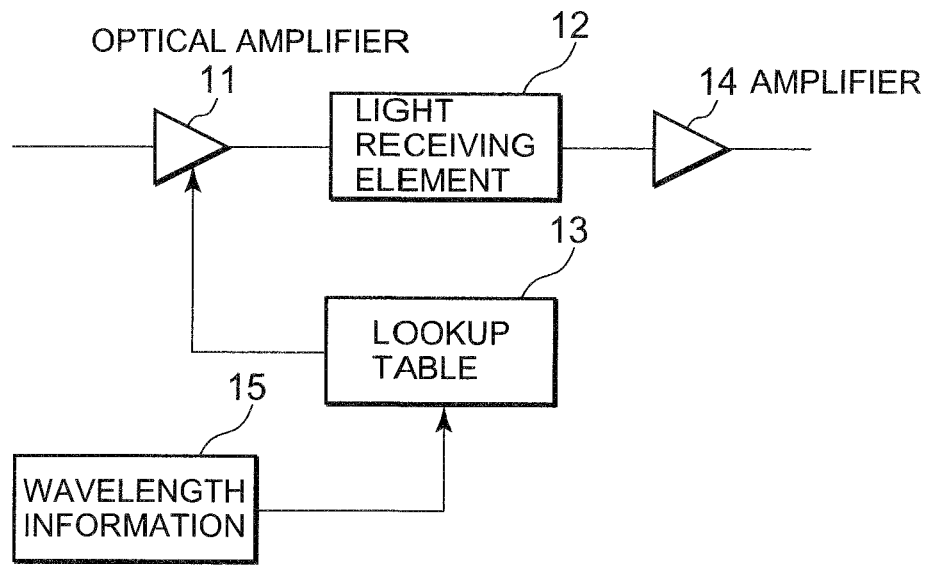
FIG. 2A is a block diagram showing an optical receiver according to a first embodiment of the present invention.

Each of optical receivers 10-1 to 10-n in FIG. 1, as shown in FIG. 2A, includes an optical amplifier 11, a light receiving element 12, a lookup table 13, and a post-stage electrical circuit (for example, amplifier) 14. The optical amplifier 11 amplifies an optical signal output from the optical demultiplexer 1 and then outputs the amplified optical signal. The light receiving element 12 converts the optical signal output from the optical amplifier 11 into an electrical signal and then outputs the converted electrical signal. The lookup table 13 records each wavelength of an optical signal and an optical output-level of the optical amplifier 11 to be associated with each other. The post-stage electrical circuit (for example, amplifier 14) processes the electrical signal output from the light receiving element 12.

When a wavelength of an optical signal varies, the lookup table 13 transmits information of an optical output-level, which is recorded to be associated with the wavelength after varying, to the optical amplifier 11. The optical amplifier 11 receives the information of the optical output-level at a control unit (not shown) in the optical amplifier 11. The control unit controls the optical output-level based on the information. Therefore, fluctuations in the quantum efficiency of the light receiving element 12 due to the wavelength fluctuations are compensated, and thereby the electrical output-level from the light receiving element 12 is maintained constant.

The lookup table 13 is a table recording correspondence between each wavelength of the optical signal input to the optical amplifier 11 and the optical output-level information of the optical amplifier 11. Therefore, the lookup table 13 enables to maintain an electric output-level from the light receiving element 12 constant, even when the wavelength of the input optical signal varies. This table may be created by learning in advance. When a wavelength of an optical signal input to the light receiving element 12 varies, the lookup table 13 transmits optical output-level information corresponding to the wavelength to the control unit of the optical amplifier 11, according to wavelength information 14. The control unit controls an electrical output-level from the optical amplifier 11 to become the optical output-level associated with the wavelength. Consequently, an optical input-level to the light receiving element 12 is adjusted in response to the wavelength. As a result, fluctuations in the quantum efficiency of the light receiving element 12 generated by the wavelength fluctuations are compensated, and thereby the electrical output-level from the light receiving element 12 is maintained constant.

As one example in which wavelengths of the optical signals input to the optical receivers 10-1 to 10-n vary, there is a case where an optical receiver 10-x (x is an arbitrary integer of 1 to n) is attached to another output-terminal of the optical demultiplexer 1 in place of a certain output-terminal thereof. The low speed optical transmission system of 10 Gbps or less, as mentioned above, generally includes an optical amplifier and an automatic level control unit (ALC). Therefore, since the ALC provides the optical amplifier with feedback, the optical output-level from the optical amplifier is controlled. Hence, each receiver can receive the optical signal at a constant power level, even when the wavelength of the optical signal varies. As a result, in the case of the low speed optical transmission system of 10 Gbps or less, amplitude fluctuations in the electrical signal generated by wavelength fluctuations can be absorbed by an electrical circuit arranged at a stage after the light receiving element as long as each receiver receives the optical signal at a constant power level.

On the other hand, the high speed optical transmission system of 40 Gbps or more, as mentioned above, places a severe constraint on the dynamic range of an electrical circuit arranged at a stage after the light receiving element. Therefore, in such a high speed optical transmission system, the amplitude fluctuations cannot be absorbed by an electrical circuit arranged at a stage after the light receiving element, even when each receiver receives the optical signal at a constant power level by ALC. For that reason, in the first embodiment, the optical output-level from the optical amplifier 11 is controlled based on the wavelength information 15 in such a way that an electrical output-level from the light receiving element 12 becomes a proper value. As a result, the electrical input-level to an electrical circuit arranged at a stage after the light receiving element 12 reaches a proper value.

Figure 2B:
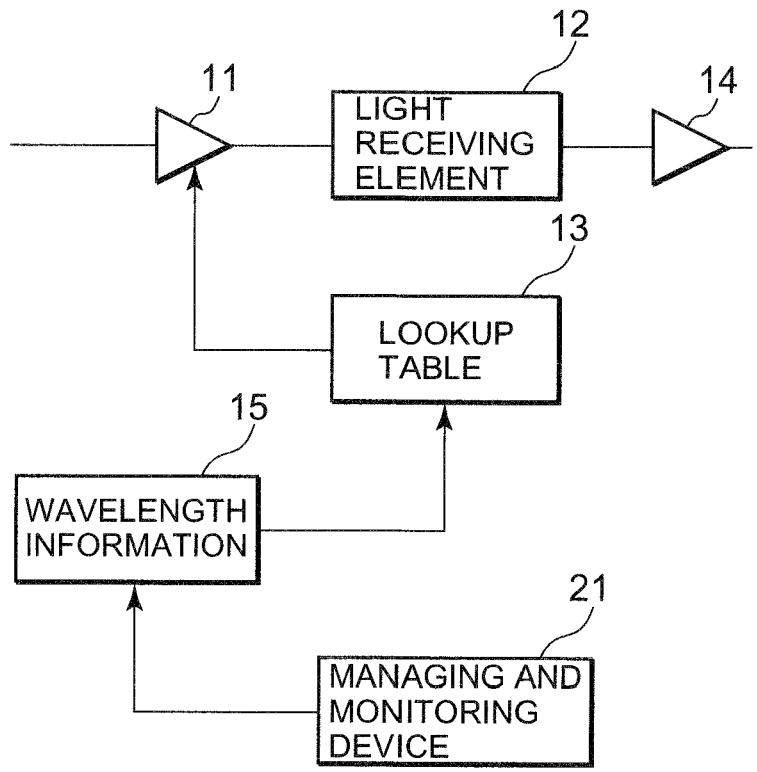
FIG. 2B is a block diagram showing another optical receiver according to a first embodiment of the present invention.

It should be noted that the wavelength information 15 may be provided from a managing and monitoring device 21 which manages and monitors the system, as shown in FIG. 2B. When the setting wavelength of the optical signal is changed, the managing and monitoring device 21 rewrites the wavelength information 15 based on the changed information.

In this case, the managing and monitoring device 21 stores information on the wavelength of an optical signal output from each output-terminal of the optical demultiplexer 1 beforehand. Therefore, when the optical receiver 10-*x* is attached to another output-terminal of the optical demultiplexer 1, the managing and monitoring device 21 transmits the wavelength information 15 on the optical signal output from the output-terminal to the lookup table 13 of the optical receiver 10-*x*. As a result, the electrical output-level from the optical amplifier 11 is more properly compensated based on the wavelength information 15 on the input optical signal.

In the first embodiment, with the configuration and operation as described above, the optical output-level from the optical amplifier, which is arranged at a stage before the light receiving element, is controlled according to the wavelength of the optical signal to be input to the light receiving element. Therefore, the first embodiment produces an effect that makes it possible to maintain the electrical output-level from the light receiving element constant, even when the wavelength of the optical signal to be input to the light receiving element varies. Furthermore, in the first embodiment, an optical reception-level more suitable for the light receiving element can be maintained, because the optical output-level from the optical amplifier is controlled. As a result, the first embodiment also produces another effect that makes it possible to ease dynamic range width required for the light receiving element.

In addition, in the case where the managing and monitoring device provides the wavelength information, when the setting wavelength of an optical signal is changed, this case also produces still another effect that quick level control can be achieved because the wavelength information is easily gained.

Figure 3:
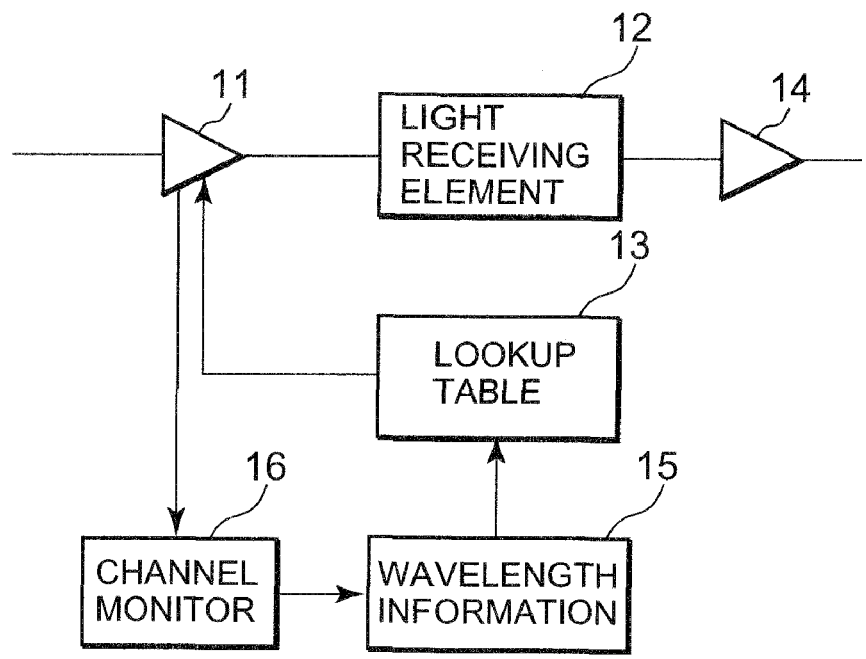
FIG. 3 is a block diagram showing an optical receiver according to a second embodiment of the present invention.

A second embodiment of the present invention will now be described. As shown in FIG. 3, an optical receiver according to the second embodiment has a configuration that a channel monitor (wavelength monitor) 16 is added to the configuration of FIG. 2A according to the first embodiment. The channel monitor 16 detects a wavelength of an optical signal input to the optical amplifier 11. The detected wavelength is transmitted to the wavelength information 15 and then transmitted to the lookup table 13. It should be noted that a channel monitor 16 may be built in the optical amplifier 11.

With the configuration and operation as described above, the second embodiment produces effects similar to the first embodiment. Furthermore, the second embodiment also produces another effect to make it possible to control the optical output-level from the optical amplifier in a more timely manner because the wavelength of the input optical signal is detected.

Figure 4:
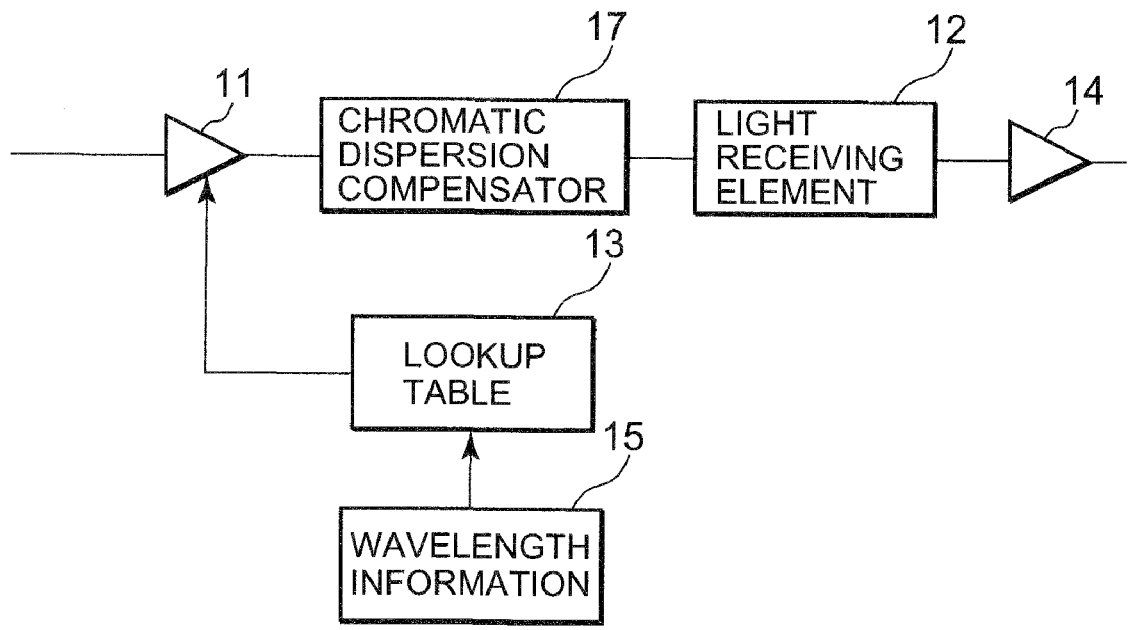
FIG. 4 is a block diagram showing an optical receiver according to a third embodiment of the present invention.

Next, a third embodiment of the present invention will now be described. An optical receiver according to the third embodiment includes a device having wavelength dependency. As shown in FIG. 4, the optical receiver has a configuration that a chromatic dispersion compensator 17 as a device having wavelength dependency is added to the configuration of FIG. 2A according to the first embodiment. Although the chromatic dispersion compensator 17 has wavelength dependency for an input optical signal, level fluctuations in the optical signal due to the wavelength dependency can also be compensated because the optical output-level from the optical amplifier is controlled at a constant level as well as the first embodiment.

With the configuration and operation as described above, the third embodiment produces effects similar to the first embodiment. Furthermore, the third embodiment also produces another effect to make it possible to compensate level fluctuations in the optical signal due to a device having wavelength dependency.

Figure 5:
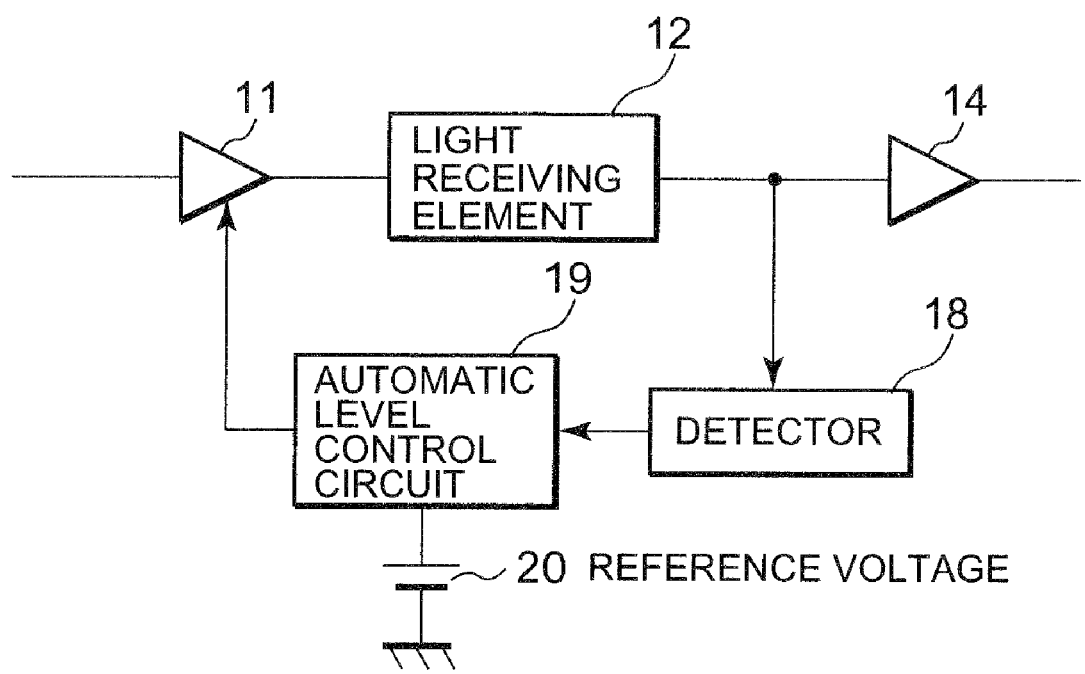
FIG. 5 is a block diagram showing an optical receiver according to a fourth embodiment of the present invention.
Figure 6:
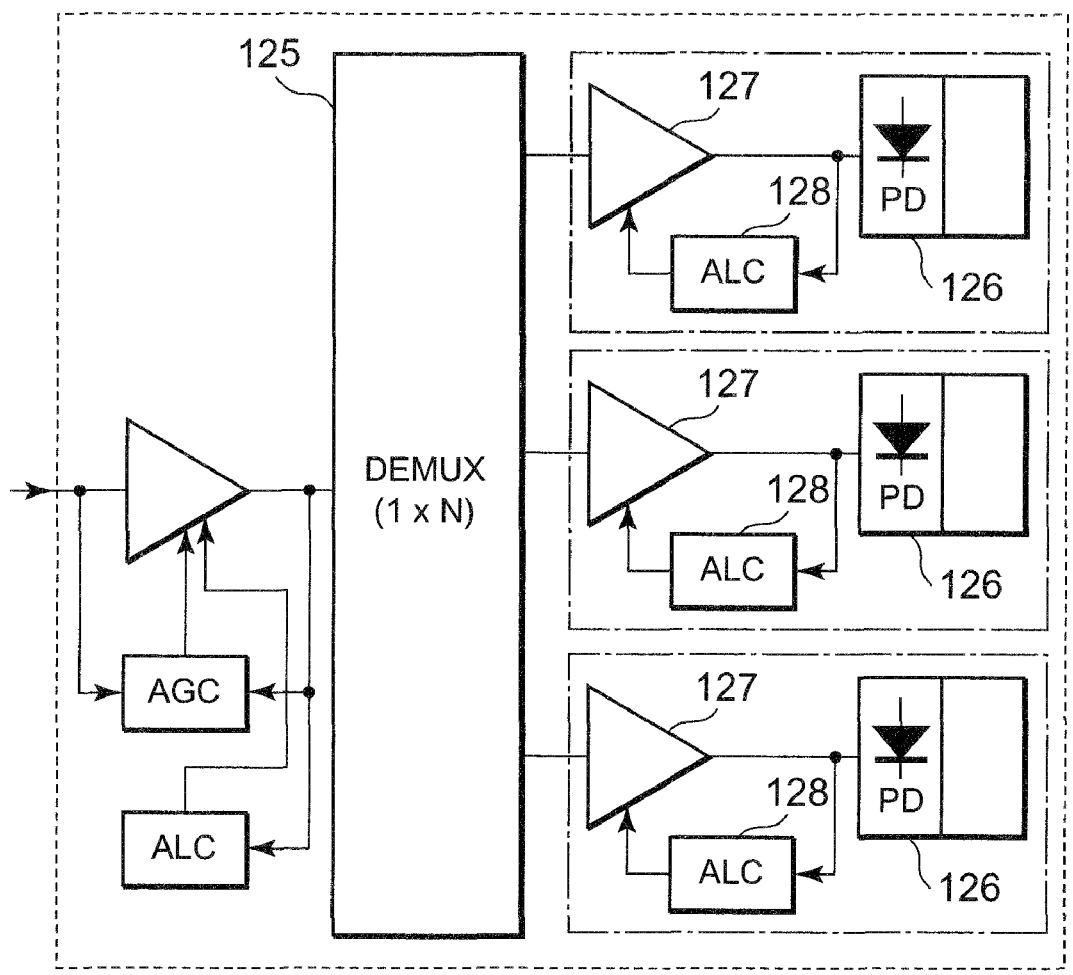
FIG. 6 is a block diagram showing an optical receiving apparatus in a conventional wavelength division multiplexing optical transmission system.
Figure 7:
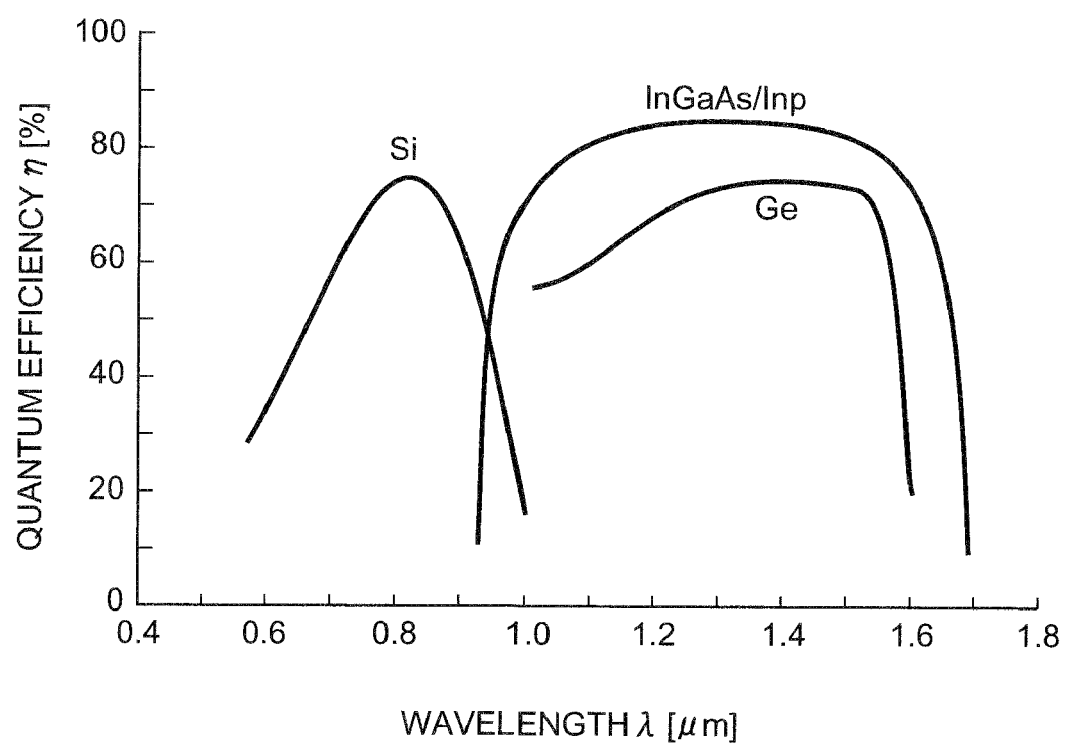
FIG. 7 is a diagram showing wavelength dependence of quantum efficiency of a typical light receiving element.

Next, a fourth embodiment of the present invention will now be described. As shown in FIG. 5, an optical receiver according to the third embodiment includes a detector 18 and an automatic level control circuit (ALC) 19 in place of the lookup table 13 and the wavelength information 15 in FIG. 2A according to the first embodiment. The detector 18 detects an electrical output-level of the light receiving element 12. The automatic level control circuit 19 compares a peak voltage detected by the detector 18 with a reference voltage 20. And then, the automatic level control circuit 19 controls an optical output-level from the optical amplifier 11 in such a way that the electrical output-level of the light receiving element 12 becomes constant according to the comparison result.

In the first through third embodiments, the optical output-level from the optical amplifier is controlled by using the lookup table 13 where the optical output-level from the optical amplifier is associated with the respective wavelength of the optical signal. On the other hand, in the fourth embodiment, the optical output-level from the optical amplifier is controlled by directly detecting the electrical output-level from the light receiving element in order to keep the electrical output-level from the light receiving element constant.

With the configuration and operation as described above, the fourth embodiment produces effects similar to the first embodiment. The fourth embodiment has also another effect that it is not necessary to make the lookup table beforehand. Furthermore, the fourth embodiment has also still another effect to make it possible to control the electric output-level from the light receiving element more accurately and in a more timely manner because the electric output-level is directly detected by the detector.

It should be noted that the above embodiments may be used in combination. For example, in the fourth embodiment shown in FIG. 5, a device having wavelength dependency such as a chromatic dispersion compensator may be placed between the optical amplifier 11 and the light receiving element 12 as well as the configuration of the third embodiment shown in FIG. 4. That case produces an effect to make it possible to compensate level fluctuations in the optical signal due to a device having wavelength dependency.

While the present invention has been described in connection with certain preferred embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

Further, the inventor's intent is to retain all equivalents of the claimed invention even if the claims are amended later during prosecution.

What is claimed is:

1. An optical receiver comprising:
    an optical amplifier configured to amplify an input optical signal and output an amplified optical signal;
    a light receiving element configured to convert said amplified optical signal into an electrical signal and output said electrical signal;
    a memory which records an information to compensate fluctuation in quantum efficiency on a wavelength of said light receiving element; and
    a control unit configured to control an output-level of said amplified optical signal based on the information.

2. The optical receiver according to claim 1,
wherein said optical amplifier comprises a control unit controlling said output-level of said amplified optical signal.

3. An optical receiving apparatus comprising:
an optical demultiplexer configured to demultiplex a wavelength division multiplexed optical signal into a plurality of optical signals having mutually different wavelengths and output said plurality of optical signals; and
a plurality of the optical receivers according to claim 1, each configured to receive a respective one of said plurality of optical signals.

4. The optical receiver according to claim 1, further comprising:
a managing and monitoring unit configured to provide said wavelength of said input optical signal for said table.

5. The optical receiver according to claim 1, further comprising:
a channel monitor configured to detect said wavelength from said input optical signal and provide said wavelength for said table.

6. The optical receiver according to claim 1, further comprising:
an optical device having wavelength dependency arranged to receive as an input said amplified optical signal, and to produce as an output a compensated optical signal, said light receiving element receiving said compensated optical signal as an input.

7. The optical receiver according to claim 6,
wherein said device having wavelength dependency includes a chromatic dispersion compensator.

8. An optical receiving method in an optical receiver, the method comprising:
amplifying an input optical signal;
outputting the amplified optical signal;
converting the amplified optical signal into an electrical signal in a light receiving element;
outputting the electrical signal; and
controlling an output-level of the amplified optical signal to compensate fluctuations in quantum efficiency on a wavelength of the light receiving element.

9. The optical receiving method according to claim 8,
wherein the amplifying step comprising:
detecting said wavelength from said input optical signal; and
controlling said output-level of said amplified optical signal according to said wavelength.

* * * * *